United States Patent [19]
Preg

[11] Patent Number: 4,956,912
[45] Date of Patent: Sep. 18, 1990

[54] UNIVERSAL TOOL HOLDER

[76] Inventor: Robert Preg, 2809 Filbert Ave., Reading, Pa. 19604

[21] Appl. No.: 324,245

[22] Filed: Mar. 15, 1989

[51] Int. Cl.⁵ ............................................. B23P 19/00
[52] U.S. Cl. ................................................... 29/730
[58] Field of Search ...................... 29/730, 731, 623.1

[56] References Cited
U.S. PATENT DOCUMENTS 4,296,546 10/1981 Hill et al. ................................ 29/730
4,583,286 4/1986 Schaumburg et al. ................ 29/730

Primary Examiner—Anthony Skapars
Attorney, Agent, or Firm—Leonard M. Quittner

[57] ABSTRACT

A tool holder useful in storage battery assembly is disclosed whose jaws are activated by an internally located piston in one of the jaws. The jaws are mounted on a multiplicity of guide rods floatingly such that when the jaws are closed a work piece will cause them to center up over the work piece despite design variations in the work piece.

21 Claims, 4 Drawing Sheets

UNIVERSAL TOOL HOLDER

CROSS-REFERENCES

There are no cross-references to, nor are there any, related applications.

FEDERALLY-SPONSORED RIGHTS

The invention herein was made without any Federal sponsorship or contribution.

BACKGROUND OF THE INVENTION

1. Field of the Invention

The field of the invention relates to an improved tool holder useful in the storage battery manufacturing and assembly arts. It also has application in the dielectric testing art and as a holder of punches and dies in the plastics piercing art.

2. Description of the Prior Art

The prior art is best demonstrated by lead intercell connector and side terminal connector welders used in manufacturing storage battery supplied by, inter alia, Tiegel Manufacturing Company and the Taylor-Whitfield Company, and modifications thereof particularly as made by General Battery Corporation and the Prest-O-Lite Corporation, now both divisions of the Exide Battery Corporation. The Tiegel type welder jaws open and close around and weld together 2 storage battery intercell connectors which are to be welded on opposite sides of a cell partition by a toggle actuation means which bring a pair of the jaws holding welding electrodes toward each other. A problem presented by this apparatus is that the space between the electrodes in the jaws is fixed not only for a defined welding region but also the position of the battery case relative to the apparatus. These factors can cause either too much weld force to be applied to the weldment thereby generating too little heat when current is applied and an unacceptable melting of lead or not enough pressure which causes a defective weld. The GBC modification utilizes a single exteriorly mounted cylinder to drive the jaws which are disposed slidably on shafts opposite each other. However, the offset of the electrodes required by the battery application causes excessive wear on the bearings from rotation or roll about the shaft axis and binding or pitching along the shaft axis. Replacement life is often measured in a few months and wear causes severe misalignment of welding electrodes. Prest-O-Lite's modification of the Taylor Whitfield apparatus utilizes one exteriorly mounted cylinder on one jaw holder in the expectation that to do so would minimize wear problems. Roll is inhibited somewhat by the installation of exteriorly mounted roller stops which increase the friction load of the mechanism significantly. Pitch is not corrected at all. As a practical matter, the maintenance cycle is somewhat lengthened but not eliminated. Also the apparatus proves to be too bulky in practice to provide the flexibility necessary for robotic applications or to manufacture different battery configurations on the same battery line.

As an additional general problem, the jaw holders remain subjected to excessive torque because of uncontrolled welding pressure thereby causing the battery partitions molded into the case to become warped. As result there are unacceptable production losses occasioned by excessive down time for maintenance or electrode replacement.

None of the prior art improvements, because of their bulkiness are adaptable to robotic use, a present growing concern. In addition, a production line must accommodate an ever increasing number of storage battery designs. By locating cylinders around the jaws exteriorly the creation of truly flexible production lines is prevented.

The work piece, the polypropylene battery case and more particularly the partitions and the cast lead intercell connectors molded therein, are susceptible in the molding process to warpage, camber or thickness irregularity. The prior art teaches no economical way to weld, test or punch around, on or through the partitions given such susceptibility.

In addition, different welders have been required if welding side terminals instead of intercell connectors, thereby multiplying the number and types of equipment needed.

SUMMARY OF THE INVENTION

Your inventor has found that the problems presented in the prior art are solved by disposition of the jaw holders on running press fit roller bearings about a mulitplicity of guide rods. Such a configuration eliminates entirely any axial roll or longitudinal pitch or binding. Friction is greatly reduced such that the components of the invention can be made of a minimum size and weight. In consequence, the actuation force can be minimized and located interiorly in the assembly thereby reducing bulk. Actuation force is utilized efficiently such that many uses within and apart from the battery assembly art are apparent.

It must be understood that the axes of the welding electrodes, as an example, are ideally collinear through the welding site for effective welding. Hence any wear factor such as one which causes the kind of pitch or roll described will cause collinearity to be lost. The unique arrangement of the present invention effectively maintains collinearity and therefore assures quality. The foregoing applies equally well to piercing with punches and dies.

The invention is summarized as an improved tool holder particularly suited in storage battery welders whether for intercell or side terminal welding but equally well suited for use as a dielectric strength tester or as a cell partition piercing punch press in the storage battery assembly arts as well as in any automated manufacture involving the assembly of a work piece to an upright planar sheet such as a battery cell partition or any sheet defining material such as polypropylene.

Tool holding jaws of the invention can be easily adjusted to any defined opening distance between them. The jaws will ride or float on rolling press fit bearing surfaces disposed against at least 3 equidistantly located guide rods actuated by one internally situated actuation cylinder such that the jaws when brought to closure will movably align around and center up upon the weld site and partition sheet perfectly regardless of design variation. The unique floating jaw holders of the arrangement eliminate wear, torque and uneven or inappropriate welding pressure. The internal cylinder saves much needed space.

In addition, the tool's configuration will permit the exchange of welding electrodes for arms equipped to test dielectric strength of battery plate separators or for arms holding punches and dies to pierce holes in the partitions. Hence the tool holder of the invention has several other applications in battery assembly and is easily adopted to other arts with similar requirements.

An object of the invention is to provide sound welds of lead connectors in storage batteries regardless of variations in cell partition or battery wall shape or construction or parts thickness.

A further object of the invention is to increase the service life of a storage battery welder and its bearings by reducing wear and distortional operating forces.

Another object is to provide a tool holder useful in storage battery assembly capable of performing a variety of tasks such as welding, dielectric testing and punching.

Other objects, advantages and features of the present invention will be apparent to those skilled in the art from the following description taken in conjunction with the accompanying drawings.

DESCRIPTION OF DRAWINGS

The present invention may be better understood by reference to the drawings wherein 4 figures are shown in 4 sheets. The numbers shown on the drawings for the various parts of the invention are consistent throughout so that a number indicating a part in one drawing will indicated the same part in another drawing.

DESCRIPTION OF THE PREFERRED EMBODIMENT

Figure 1:
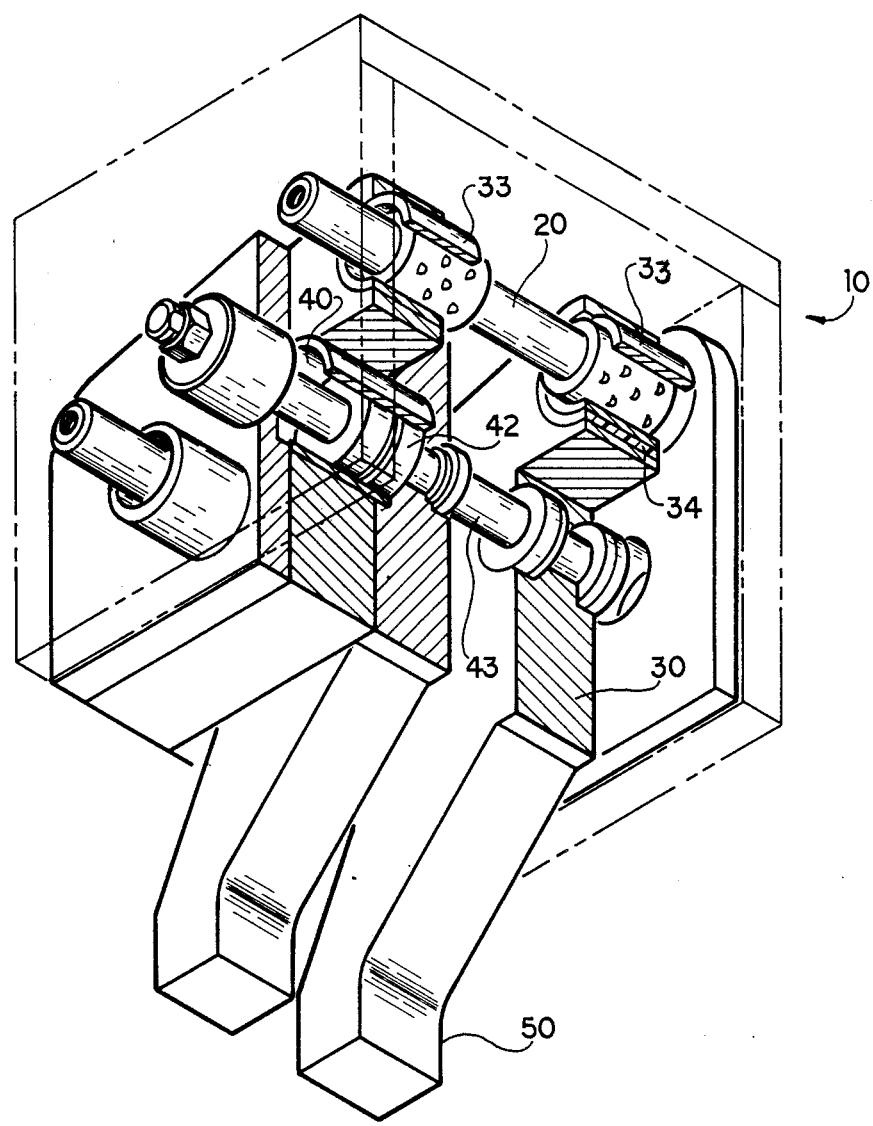
FIG. 1 shows a cut away pictorial view of the tool holder.
Figure 2:
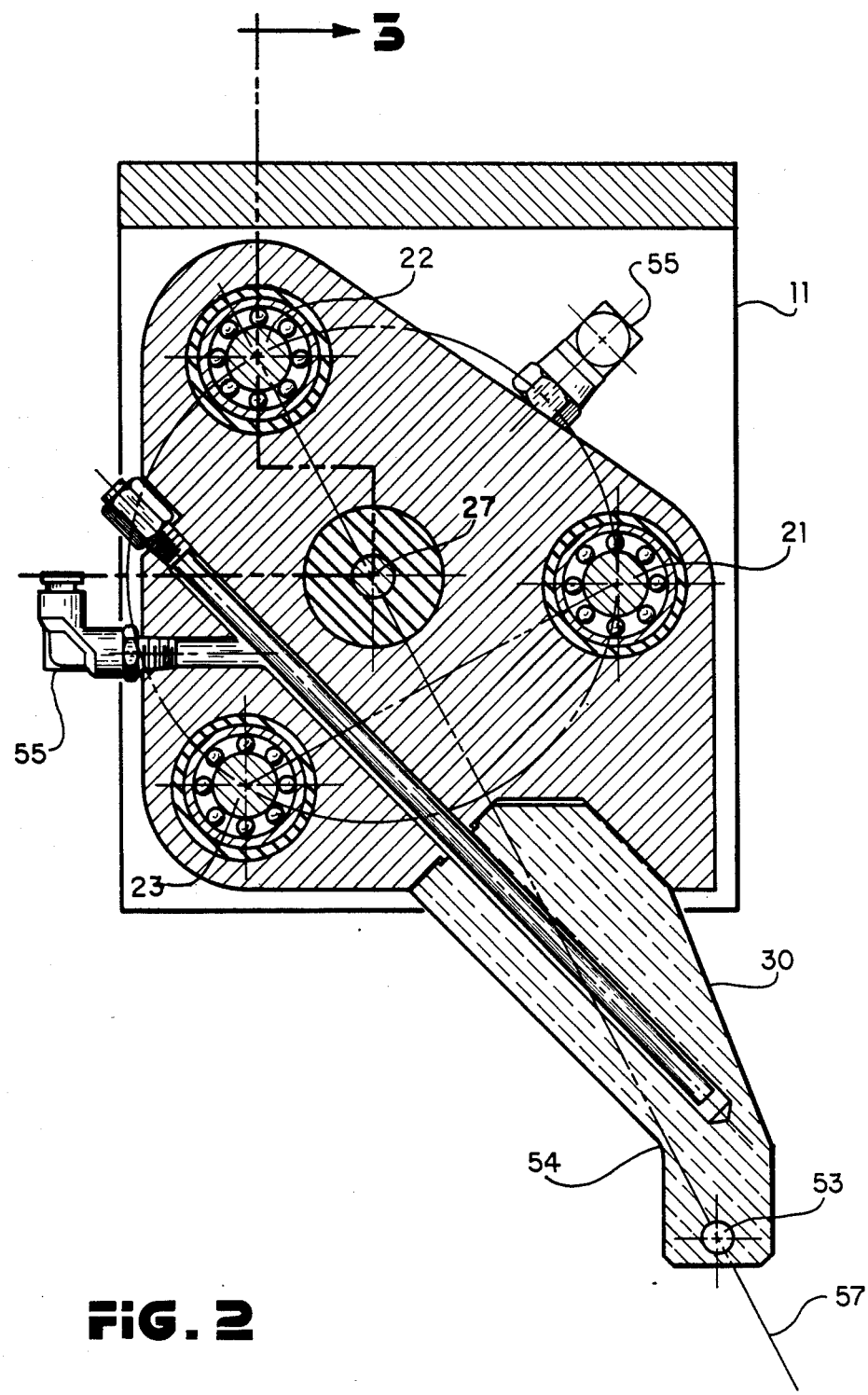
FIG. 2 is a cross-sectional elevation of the tool holder as seem from the side.
Figure 3:
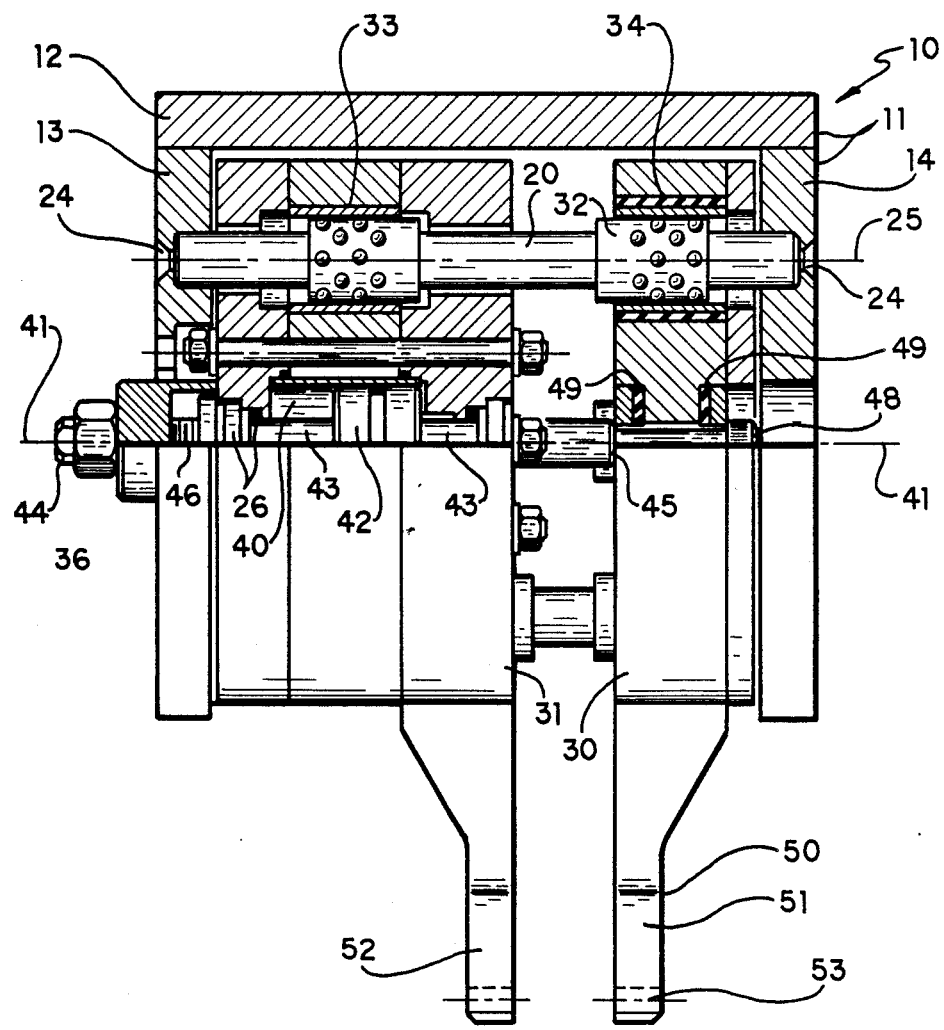
FIG. 3 is a view of the tool holder through the lines 3—3 in FIG. 2.

The preferred embodiment is a tool holder 10 of the invention comprising a metal housing 11 typically of aluminum, which has a top 12, and a first 13 and a second side 14 disposed perpendicularly to the top at its ends. Holding the sides in parallel alignment are a multiplicity of guide rods 20 of which there is at least a front guide rod 21, a top guide rod 22 and a rear guide rod 23 attached to the sides by guide rod screws 24. The guide rods are disposed relative to each other along their longitudinal axes 25 equidistantly 26 about a geometric center point 27.

Slidingly fitted onto the guide rods are a first insulated jaw holder 30 and a second grounded jaw holder 31 which float on the guide rods by means of rolling press fit ball bearings 32 (Lempcotype), typically installed in bearing bushings 33. The insulated jaw holder is electrically insulated from the guide rods, their bearings and the grounded jaw holder by means of insulation sleeves 34 fitted over the bearing bushings. These are made of an electrically non-conducting material such as aluminum which is hard anodized with a substantial electrically inert material capable of insulating the generally electrically conductive parts adjacent to them from a current flow ratged at about 15 kiloamps.

Disposed in the grounded jaw holder is a cylindrical chamber 40 whose longitudinal axis 41 is parallel to the axes of the guide rods and whose linear extension passes through the center point 27. The chamber is fitted with a double acting fluid driven piston 42 through which is attached a shaft 43 whose longtiudinal axis coincides with the chamber axis and has a first end 44 and a second end 45. The first shaft end is externally threaded 46, and emanates from the grounded jaw holder, passes through an aperture in the first housing side 13 and a restraining collar, a gland nut and seal 26 to an adjusting nut 47 which is threaded onto the first shaft end and backed by a locknut 36 such that the shaft stroke length and, therefore the tool jaw opening can be varied by rotating the nut to stop against the housing. The second shaft end emanates from the grounded jaw holder and is affixed in contact with the insulated jaw holder by means of a through bolt 48 threaded into the shaft end and is insulated from the jaw holder by means of non conducting washers 49.

Fitted into the jaw holders are jaws 50 which may be designed to accomplish several tasks in the storage battery assembly art such as welding, dielectric strength testing and hole piercing. Shown in the drawings of this preferred embodiment are a first jaw 51 and a second jaw 52 to hold welding electrodes (not shown) in holding apertures 53 which are disposed opposite each other on a common axis. The jaws typically are made of a high electrical conducting metal such as beryllium copper and are offset 54 from the housing 11 to improve the reach of the electrodes during welding. Typically the jaws will be fitted through the housing with cooling means 55 and welding current supplying means. To minimize torque when pressure is applied between jaws which are offset, your inventor has found particularly in the welding application that the center of the holding aperture 53, the geometric point 26 and the longitudinal axis 25 of at least one guide rod should lie on or intersect with a straight line 57.

Even though it is not shown, if is understood that the present invention may be mounted on a rotation means in a welder frame for rotation 90 degrees such that side terminal welding where required or other intercell welding if the assembly requires it.

In the other applications mentioned, the electrodes may be replaced with dielectric probes to test the dielectric strength of battery plate separators or with a punch and die set for piercing the battery partitions to receive intercell connectors.

Figure 4C:
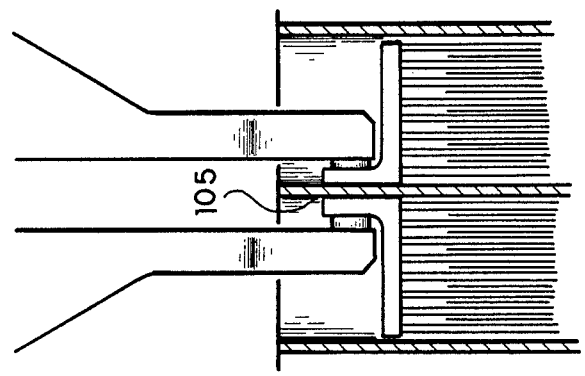
FIG. 4a–c depict step wise the centering capability of the tool holder relative to a battery being assembled.
Figure 4B:
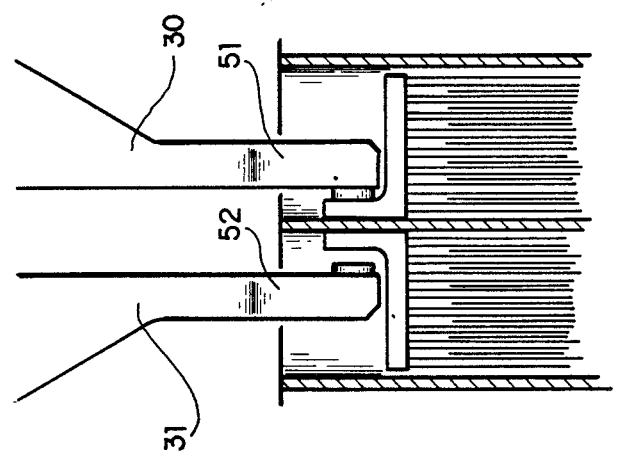
Figure 4A:
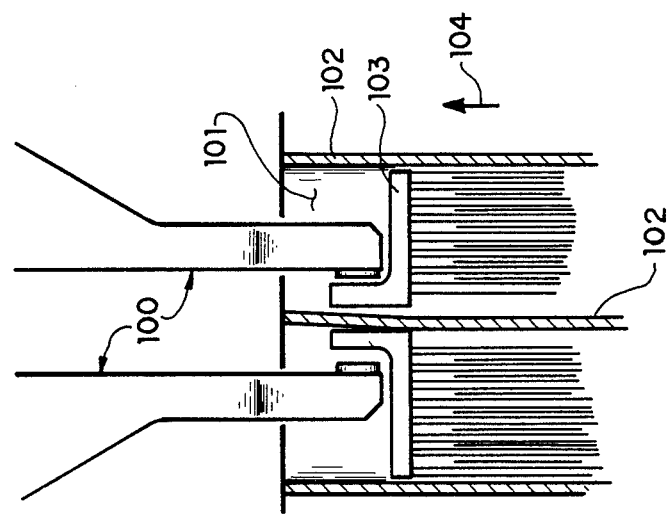

Attention is directed to FIG. 4 for a description of the welding sequences in storage battery assembly. After setting a defined weld spacing 100 by means of the adjustment nut 47 on the piston shaft 43, a battery case 101 with cell partitions 102 which are essentially upright planar sheets and cell interconnectors 103 to be welded together through the partition are brought into welding position (FIG. 4a) as the battery case is raised 104 to position the weld site at the electrodes.

The piston is actuated to bring the jaw holders 30, 31 holding the jaws 51, 52 toward each other. See FIG. 4b. Owing to a misalignment, typically caused by camber or warpage in the cell partition or mispositioning of the battery case, one or the other of the jaws and its electrode may be engaged at the intercell connector first. As the piston continues to exert pressure its action will draw the unengaged holder toward the engaged one. See FIG. 4c. As both jaws make compression contact with the intercell connector the jaw holders will floatingly move toward engagement with each other to center up over the welding interface 105 of the connectors under correct welding pressure.

Since many modifications, variations and changes in detail may be made to the presently described embodiment, it is intended that all matter in the foregoing description and accompanying drawings be interpreted as illustrative and not by way of limitation.

What is claimed is:

1. A tool holder useful in the assembly of an electronic storage battery case work piece having at least one cell partition comprising:
   (a) a housing;
   (b) movable first and second jaw holders for holding jaws which are disposed on sliding means in the housing which houses a multiplicity of guide rods whose longitudinal axes define point centers equidistantly disposed about a defined geometric point center from each other;
   (c) the first jaw holder having constructed interiorly a cylindrical piston chamber in which is disposed a fluid driven reciprocating piston with a shaft whose longitudinal axis is parallel to the guide rod axes and has lying on its linear extension the geometric center point;
   (d) the shaft being connected to the second jaw holder such that the first and second jaw holders will move toward each other to close and away from each other to open slidingly on the guide rods by bearing means;
   (e) and when closed the jaw holders will center up slidingly over the workpiece partition.

2. A tool holder as in claim 1 wherein the second jaw holder is insulated electrically from the first jaw holder by insulation means.

3. A tool holder as in claim 2 wherein the insulation means are electrically non-conducting insulation sleeves with a defined insulation strength situated in electrical insulation contact with the guide rods.

4. A tool holder as in claim 3 wherein the insulation sleeves are made of aluminum which has been coated with a hard anodizing material which is electrically non-conducting sufficient to insulate the tool holder parts from a current of 15 kiloamps.

5. A tool holder as in claim 1 wherein the guide rods are 3 in number and whose point centers are disposed equidistantly and equiangularly about the geometric center point.

6. A tool holder as in claim 5 wherein the bearings means are rolling press fit bearings in sliding contact with bearing sleeve bushings.

7. A tool holder as in claim 1 wherein the fluid driving the piston is hydraulic oil.

8. A tool holder useful in the assembly of a work piece to an upright planar sheet made of a rigid material comprising:
   (a) a housing;
   (b) movable first and second jaw holders for holding jaws which are disposed on sliding means in the housing which houses a multiplicity of guide rods whose longitudinal axes define point centers equidistantly disposed about a defined geometric point center from each other;
   (c) the first jaw holder having constructed interiorly a cylindrical piston chamber in which is disposed a fluid driven reciprocating piston with a shaft whose longitudinal axis is parallel to the guide rod axes and has lying on its linear extension the geometric center point;
   (d) the shaft being connected to the second jaw holder such that the first and second jaw holders will move toward each other to close and away from each other to open slidingly on the guide rods by bearing means;
   (e) and when closed the jaws will center up slidingly over the work piece and the upright sheet.

9. A tool holder as in claim 8 wherein the jaw holders hold welding electrodes for welding.

10. A tool holder as in claim 8 wherein the jaw holders hold means for piercing the upright sheet.

11. A tool holder as in claim 10 wherein the piercing means are a punch and die.

12. A tool holder as in claim 8 wherein the jaws hold dielectric test probes for testing the dielectric strength of a storage battery plate separator.

13. A tool holder as in claim 8 wherein the rigid material is chosen from a class comprising a plastic or metal.

14. A tool holder as in claim 13 wherein the plastic is polypropylene.

15. An electric storage battery having lead intercell connectors which have been welded to each other through at least one cell partition therein by an electric resistance welder have an electrode holder comprising:
   (a) a housing;
   (b) movable first and second jaw holders for holding jaws which are disposed on sliding means in the housing which houses on a multiplicity of guide rods whose longitudinal axes define point centers equidistantly disposed about a defined geometric point center from each other;
   (c) the first jaw holder having constructed interiorly a cylindrical piston chamber in which is disposed a fluid driven reciprocating piston which a shaft whose longitudinal axis is parallel to the guide rod axes and has lying on its linear extension the geometric center point;
   (d) the shaft being connected to the second jaw holder such that the first and second jaw holders will move toward each other to close and away from each other to open slidingly on the guide rods by bearing means;
   (e) and when closed the jaw holders will center up slidingly over the work piece partition.

16. An electric storage battery as in claim 15 wherein the second jaw holder is insulated electrically from the first jaw holder by insulation means.

17. An electric storage battery as in claims 15 wherein the insulation means are electrically non-conducting insulation sleeves with a defined insulation strength situated in electrical insulation contact with the guide rods.

18. An electric storage battery as in claim 15 wherein the insulation sleeves are made of aluminum which has been coated with a hard anodizing material which is electrically non-conducting sufficient to insulate the tool holder parts from a current of 15 kiloamps.

19. An electric storage battery as in claim 15 wherein the guide rods are 3 in number and whose point centers are disposed equidistantly and equiangularly aobut the geometric center point.

20. A process for assembling an electric storage battery with a casing having at least one cell partitiion with an intercell connecting passage there through disposed in the casing to define at least two storage cells comprising the steps of:
   (a) installing a multiplicity of storage plates in a stack in the cells;
   (b) installing lead intercell connectors onto the plate stacks and through the connecting passage alignningly with each other;
   (c) locating the battery case in a position relative to an electric resistance welder such that the partition is disposed between electrodes of the welder.

(d) welding the intercell connectors to each other in electricity conducting contact by means of the electric resistance welder having an electrode holder comprising:
  (1) a housing;
  (2) movable first and second jaw holders for holding jaws which are disposed on sliding means in the housing on a multiplicity of guide rods whose longitudinal axes define point centers equidistantly disposed about a defined geometric point center from each other;
  (3) the first jaw holder having constructed interiorly a cylindrical piston chamber in which is disposed a fluid driven reciprocating piston with a shaft whose longitudinal axis is parallel to the guide rod axes and has lying on its linear extension the geometric center point;
  (4) the shaft being connected to the second jaw holder such that the first and second jaw holders will move toward each other to close and away from each other to open slidingly on the guide rods by bearing means;
  (5) and when closed the jaw holders will center up slidingly over the work piece partition.

21. A process for assembling batteries as in claim 20 wherein side terminals are installed on the plate stacks and through the battery casing before welding and then welding them.

* * * * *